| | I | II | III | IV | V | VI | VII | VIII | IX | X | XI | XII |
|---|---|---|---|---|---|---|---|---|---|---|---|---|
| | FWD | FWD | FWD | REV | REV | FWD | REV | FWD | REV | | | |
| XB-XA | X | | | | | | | | | X | X | |
| 1 DELAY TIMER | X | | | X | | | | | | | | |
| 2 DELAY TIMER | X | | X | X | | | | | | | | |
| 3 L&R SIDE BRUSH AIR | | X | X | X | | | | | | | | |
| 4 WASH WATER | X | X | X | X | X | | | | | | | |
| 5 RINSE WATER | | | | | | X | | | | | | |
| 6 WAND SWITCH | | | | | | X | X | X | | | | |
| 7 AIR SOL, TOP BRUSH | X | | | | | | X | | X | | | |
| 8 WAX SOL. & INDICATOR | | | | | | X | X | | | | | |
| 9 BLOWER | | | | | | | | X | X | | | |
| 10 TOP BRUSH | X | X | | | | | | | | | | |
| 11 SIDE BRUSH FWD | X | X | X | | | | | | | | | |
| 12 SIDE BRUSH REV | | | | X | X | | | | | | | |
| 13 DRIVE FWD | X | X | X | | | X | | X | | | | |
| 14 DRIVE REV | | | | X | X | | X | | X | | | |
| 15 WATER PUMP | X | X | X | X | X | X | X | | | | | |
| 16 RUNNING RED LIGHT | X | X | X | X | X | X | X | X | X | X | X | |
| 17 START GREEN LIGHT | | | | X | X | | | | | | | |
| 18 SOAP SOL | X | X | X | X | X | | | | | | | X |

United States Patent Office 3,428,983
Patented Feb. 25, 1969

3,428,983
VEHICLE WASHER
Raymond Seakan, 801 Wager St., Utica, N.Y. 13502
Filed July 3, 1967, Ser. No. 650,876
U.S. Cl. 15—21                 9 Claims
Int. Cl. B60s *3/06*

ABSTRACT OF THE DISCLOSURE

Vehicle washing apparatus for washing a parked vehicle comprising a frame having spaced columns movable under power along rails in opposite directions lengthwise of the vehicle, rotary flexible bristle brushes mounted on arms pivoted in staggered relation on the columns and adapted to swing toward the vehicle and through an angle of approximately 180 degrees and between positions extending forwardly of the frame, and rearwardly of the frame, under air pressure, the brushes being pushed forwardly of the frame on forward movement, and rearwardly on reverse movement, the brush arms completing movement through an angle of 180 degrees upon reaching an end of the vehicle, and moving inwardly and outwardly over a half of the vehicle end completing movement through the angle of 180°.

---

This invention relates to vehicle washing apparatus, and more particularly to the washing of the sides of vehicles using rotary brushes.

In U.S. Patent 3,300,803 issued Jan. 31, 1967, there is disclosed a car washer wherein a car is driven into and parked in a wash area, and washed by a gantry like car wash apparatus travelling back and forth over the length of the vehicle, on trackways. In that apparatus a pair of rotary brushes of considerable diameter and having a multitude of flexible nylon bristles are mounted on swinging arms pivoted on the gantry side columns and are simultaneously drawn around an end of the car and then along the opposite sides, and after reaching the other end the brushes are swung into position to contact the other end of the car after which they are drawn outwardly across the end and back along the vehicle sides, the brushing operation being accompanied by a deluge of detergent wash water supplied from spray nozzles carried by the travelling frame.

While such apparatus has proved to be highly efficient and ideally suited for automatic operation, the design of the ends of certain vehicles is such that the brushes tend to be caught in the reentrant portions of the front or rear bumpers adjacent the corners, and thereby interfere with the automatic operation otherwise possible from merely moving the apparatus along the length of the car.

Additionally, the two brushes, being of a large diameter, when simultaneously swung against the front or rear of the vehicle, were in some instances unable to scrub the center sections, because of brush interference.

The present invention is directed to a substantial rearrangement of the apparatus so as to avoid the foregoing difficulties completely. The invention comprises the mounting of the brush supporting arms in staggered relation upon the opposite columns of the gantry or carriage so that the brushes may sequentially scrub the front or rear end of the vehicle. By such staggered mounting, the brushes are mounted on arms sufficiently long so that the bristles of each brush may at least reach the center of the vehicle, and by reason of the staggered mounting, one brush may move into the center, and recede from the center as the second brush moves in. In this manner interference is avoided, and a complete scrubbing over the entire width of the end results.

The invention furthermore is directed to reversing the procedure previously employed, and comprises the concept of pushing the brushes along the sides of the vehicle ahead of the gantry or bridge, and urging the brushes into end brushing position after completion of travel along the vehicle sides, thereby avoiding any possibility of brush interference with front or rear end reentrant car design. Furthermore, after the brushes sequentially scrub inwardly and reach the center of the car end, the gantry continues its movement while the brushes move outwardly and scrub the end during the process of assuming a position for return along the vehicle sides being pushed, in advance of the carriage in its return travel along the vehicle. Scrubbing of the other end of the vehicle is effected in a like manner after travel back along the vehicle sides, the brushes scrubbing the other end sequentially inwardly to the center, and then outwardly as they swing back into their initial position. The swinging of the brush arms into position for the return pass is employed to initiate reverse travel.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts.

Figure 1:
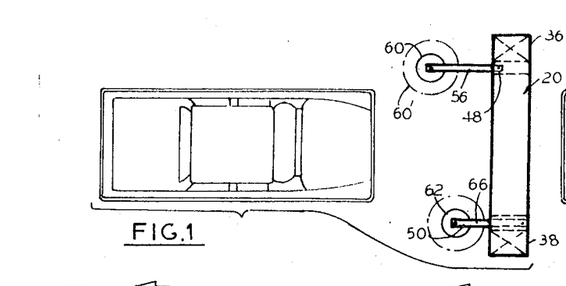
FIGURES 1–15 inclusive, illustrate diagrammatically fifteen successive positions of the wash apparatus in reference to a parked car during the initial forward and return wash traverses over the vehicle.
Figure 2:
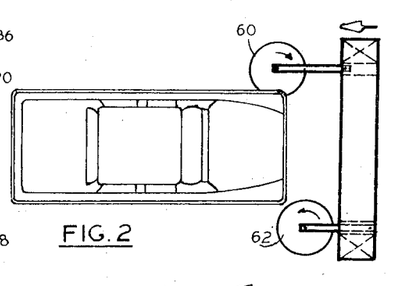
Figure 16:
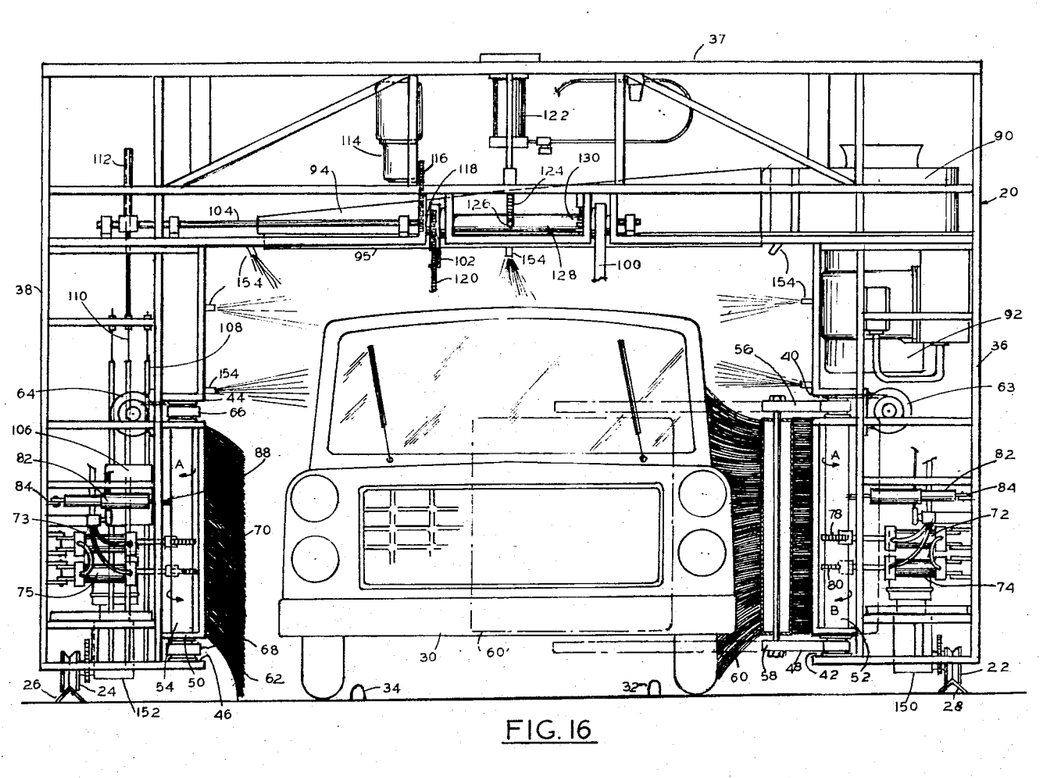
FIGURE 16 is a rear view of the apparatus with parts broken away.

In FIGURE 16, there is shown a travelling carriage or gantry like structure 20, comprising an inverted U shaped frame having power driven wheels 22 and 24 riding on parallel tracks 26 and 28. When a car 30 is centrally located as by wheel guides 32 and 34, the apparatus is initially disposed forward of the front end of the parked car in the approximate location in reference to the car as indicated in FIGURE 1. The travelling apparatus comprises opposed column structures 36 and 38 and a connecting overhead bridge 37. Each of the columns have horizontally disposed upper and lower recesses 40 and 42, and 44 and 46 in the sides facing each other, and brush supporting assemblies, 48 and 50 pivotally mounted in the diagonally opposite inside corners of the opposite columns, as indicated in any one of FIGURES 1–15 and in FIGURE 16. Each brush assembly comprises a tubular member 52 or 54 respectively, having upper and lower arms 56 and 58 and 66 and 68 respectively affixed thereto, the extremities of the arms having mounted therebetween rotary brushes 60 and 62 of the nylon bristle type. The brushes have an overall diameter of about 36 inches when rotating and extended by centrifugal force, as indicated at 60′. The arms 56 and 58 of the brush assembly 48 swing in the recesses 40 and 42, and are pivoted in the upper and lower sides of the receses 40 and 42 respectively adjacent the front of the travelling carriage, while the brush assembly 50 is pivoted in the upper and lower faces of the recesses 44 and 46 respectively, near the rear of the carriage. The recesses provide clearance for the arms 56 and 58, and 66 and 68 to swing through an angle of 180°, so as to extend forwardly of the carriage when the carriage moves forwardly, and extend rearwardly of the carriage when the carriage movement is reversed for the second part or pass of the washing operation.

The rotary brushes 60 and 62 are rotated by chain drives housed in the channel section of the upper arms 56 and 66 respectively, and derive their power from reversible preferably 3 phase motors 63 and 64 having reduction gearing, and chain drives to double sprockets journalled on the upper ends of the assemblies 48 and 50, immediately below the pivot of the assembly in the underside of the upper recesses 40 and 44, all of which is similar to that shown in Patent #3,300,803.

In FIGURE 16 the brush assembly to the right is shown in its rotating aspect, and is yieldingly held against the side of a vehicle. For illustrative purposes only, the left hand brush assembly is shown in its nonrotative aspect and retracted with its bristles drooping and out of contact with vehicle. As will appear hereinafter, the practice, both brushes rotate simultaneously, when rotating. When not rotating, the bristles 70 droop to substantially reduce the diameter of the brushes as indicated at 70', so that they may be retracted to a position out of contact with the vehicle and thus clear the vehicle.

Each of the brush assemblies are urged into vehicle contact by the swinging of the arms 56 and 58, and 66 and 68. Each of the tubular members 52 and 54 are provided with a pair of air cylinders 72 and 74, and 73 and 75 pivotally mounted at one end on the carriage columns 36, and 38 respectively as at 76. The piston rods of the cylinders 72 and 74, and 73 and 75 are provided with short flexible cables or chains 78 and 80 respectively, which wrap around the tubular members 52 and 54 in opposite directions and are anchored thereto, whereby introducing air under pressure into cylinder 72 tends to rotate the brush assembly 48 in the direction of arrow A, and introducing air under pressure into cylinder 74 tends to rotate the brush assembly 48 in the direction of arrow B, the rotation being limited to 180 degrees between the two end positions. In a similar fashion when either cylinder 73 or 75 in column 38 is activated, rotation of the brush assembly 50 is urged in either the direction of arrow A or arrow B, respectively. Since either cylinder 72 or cylinder 74 are activated, the inactive ends of the cylinder may be connected as at 79 to permit free flow of air therebetween.

Shock absorbers 82, also connected to the frame columns 36 and 38 as at 84 are pivotally connected to an arm 86 on member 52, or arm 88 on member 54, and each acts to dampen the rotation of its respective brush asembly as either moves toward either of its end positions.

The overhead structure 37 of the carriage is provided with a blower 90 driven by a motor 92, the blower having a long tapered duct 94 and an elongated nozzle 95 directed downwardly. The overhead structure also carries a horizontal axis rotary brush assembly, not shown, on the ends of arms 100 and 102 affixed to a rock shaft 104. The brush is divided into three parts, the center portion being between the arms 100 and 102. The weight of the assembly is partially counter-balanced by a weight 106 riding on guides 108, having a cable or chain 110 connected to a lever arm 112 affixed to the rock shaft 104. Rotation to the overload brush is imparted by a motor and speed reducer 114, a chain drive 116 to a double sprocket 118 journalled on the rock shaft 104 and a second chain drive 120 extending to the brush, the latter being partly enclosed in the channel section of the arm 102. The overhead brush assembly is lifted clear of the vehicle by activation of an air cylinder 122, having a flexible chain 124 connected to an arm 126 on the drum 128 affixed to the rock shaft 104. When the top brush assembly is lifted to a position clear of the vehicle, a safety switch 130 is closed. Unless such switch is closed, reverse movement of the carriage, is prevented since the top brush assembly is only adapted to be drawn over the top contour of the vehicle in one direction. Much of the foregoing will be found to be adequately shown in Patent 3,300,803, and need not be illustrated in further detail herein.

Figure 17:
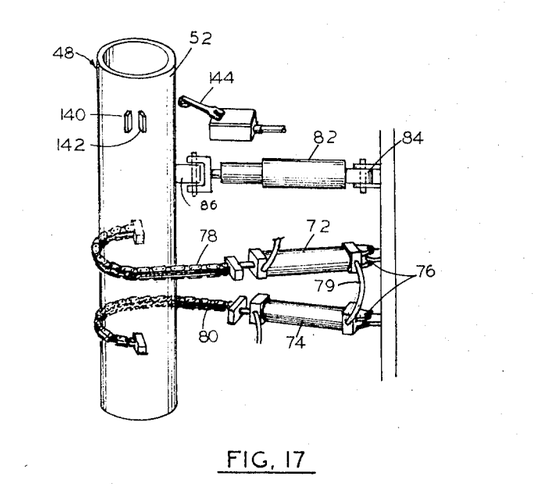
FIGURE 17 is a fragmentary perspective view of one of the brush swinging members.

One of the brush assembly members 52 is provided with a pair of limit switch actuating lugs 140 and 142 (see FIGURE 17) adapted to actuate a switch 144 mounted on the frame 36, the lugs being so adjusted in reference to the limit switch as to initially trip the switch as the brush assembly 48 approaches positions to be described hereinafter.

Figure 3:
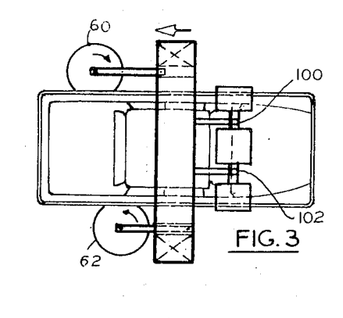

Referring to the sequence of FIGURES 1–15, in FIGURE 1, the car 30 with its front end at the right has been driven into place and parked in position facing the front of the car wash assembly, diagrammatically indicated at 20, with its opposite side columns 36 and 38 and the brush assemblies 48 and 50 pivoted on the columns in staggered relation, so that the brush 60 is about 20 inches in advance and to the left of brush 62. When the car is properly positioned, a treadle switch is closed. Thereafter by the closing of an operator controlled switch, or a coin operated switch previously, the reversible, preferably 3 phase carriage motors 150 and 152 are energized and the carriage commences to move in the direction of arrow I, at a constant speed of approximately one foot per second. At the same time detergent laden wash water is sprayed over the sides and top of the vehicle, the nozzles 154 being aimed to direct such spray well ahead of the movement of the carriage. At the same time rotation of the brushes 60 and 62 in the direction as indicated by the arrows C and D commences, and the top brushes are set in rotation and allowed to lower by gravity so as to be drawn over the car contour. After a five second delay the carriage has reached the position a little beyond that shown in FIGURE 2, and air is admitted to the cylinders 72 and 73 causing the brush arms 56 and 66 to swing toward and be urged toward each other to apply even pressure of the brushes against the sides of the vehicle irrespective of vehicle width. The carriage continues along the car pushing the side brushes ahead and drawing the top brush over the top, as indicated in FIGURE 3.

Figure 4:
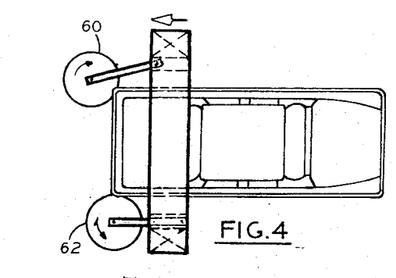
Figure 5:
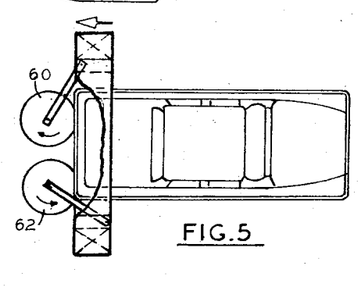
Figure 6:
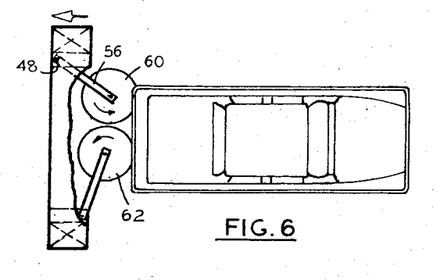

As the carriage continues to the position shown in FIGURE 4, the brush 60 commences under air pressure in cylinder 72 to move inwardly around the rear corner of the vehicle and as the carriage proceeds further to the position in FIGURE 5, the brushes 60 and 62 are moved toward the center of the vehicle by both air cylinders 72 and 73, brush 60 being ahead of brush 62 in this operation by reason of the staggered pivotal mounts on the columns 36 and 38. In FIGURE 6 the brushes are pulling away from center, but are continually urged against the vehicle rear by the action of the air cylinders 72 and 73. As the carriage reaches the position shown in FIGURE 7, the brush 60 has left the vehicle, while the brush 62 is completing its outward travel across the rear end of the vehicle.

Figure 7:
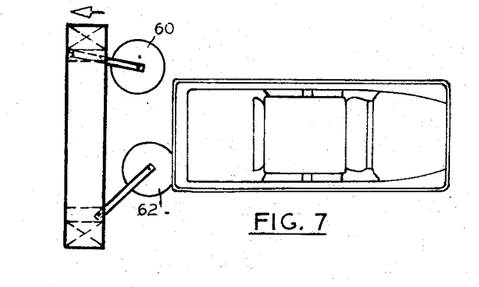

Shortly after the position shown in FIGURE 6, brush arm 56 swings to the position shown in FIGURE 7 as the brush 60 loses contact with the vehicle. Its swing is damped or retarded by the shock absorber 82 and before reaching the position shown in FIGURE 7, the cam 142 actuates the limit switch 144 which cuts on the air to the top brush air cylinder, and lifts the top brush clear of the vehicle, and closes the safety switch 130. Thereafter the carriage travels to the position shown in FIGURE 8, while the retarded movement of the arm 56 moves to its end position shown in FIGURE 8, at which time cam 140 again trips switch 144 to reverse the drive motors 150 and 152 and initiate the reversal of the brush motors 62 and 64, provided safety switch 130 is closed. Due to the inertia of the water soaked brushes, a few seconds time delay is provided before application of reverse current to such motors, thus permitting them to come to rest before restarting in the reverse direction.

Thereafter as the apparatus travels through the successive stages illustrated in FIGURES 8–15, washing continues. Rinse water instead of detergent water may be employed, if desired, since the vehicle is already soaked with detergent. The side brush action on return is substantially the same except reversed and the overhead brush is held clear. On the return, the air cylinders 74 and 75 urge the arms 56 and 66 to swing clockwise and counter-clockwise respectively, to administer uniform brush pressure against the vehicle sides irrespective of its width.

Figure 11:
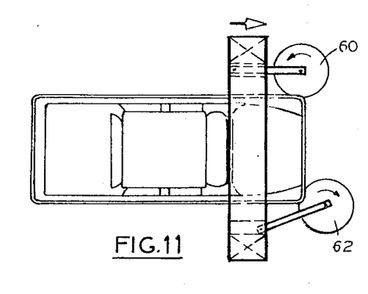
Figure 12:
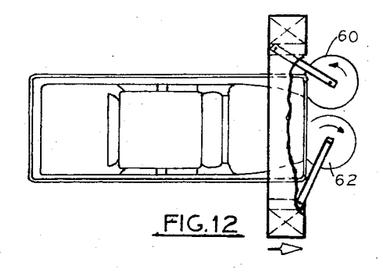
Figure 13:
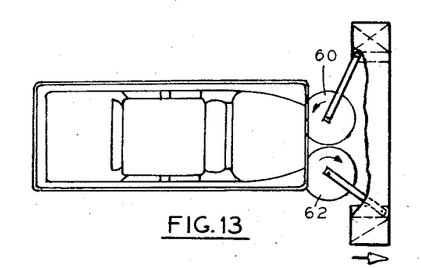
Figure 14:
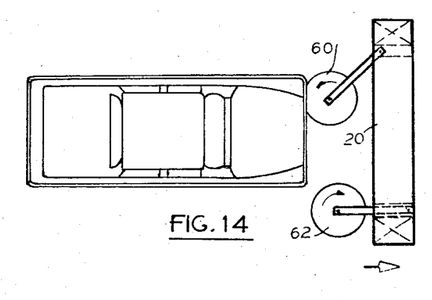
Figure 15:
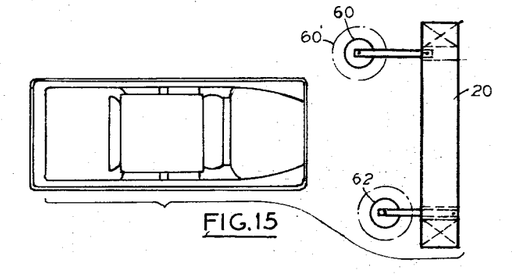

As the carriage approaches the front of the vehicle the brush 62 commences under air pressure in cylinder 75 to move inwardly as indicated in FIGURE 11. Shortly thereafter brush 60 also commences to move inwardly, the brushes 62 and 60 each moving in sequence a sufficient distance toward the center so that the bristles of brush 62 will reach to the center after which the brush will recede outwardly away from center as brush 60 moves so that its bristles reach to center. Thereafter as in FIGURE 13, both brushes are moving away from center under the continuous urge of air cylinders 74 and 75, and in FIGURE 14, brush 62 has swung clear as brush 62 is about to leave the front end of the vehicle. Thereafter the carriage returns to the end position shown in FIGURE 15 with the brushes in the start position.

Following the two passes over the vehicle, all further passes of the carriage are conducted with the side brushes and also the overhead brush held clear of the car, the side brushes drooping, and being held clear by retaining the air cylinders 74 and 75 under pressure, and the top brush being held clear by the air cylinder 122 being under pressure, with safety switch 130 being held closed thereby.

Washing of the vehicle can be effected in four passes of the carriage over the vehicle. If washing in four passes is desired, rinse water instead of detergent water will be employed on the second pass and third pass, and wax solution may be added to the rinse water on the third pass. On the fourth pass, the blower is activated to dry the vehicle. If washing in six passes is desired, detergent water will be employed during both of the first and second passes, and rinse water on the third and fourth passes, either with or without wax solution, and blower operation will be employed on the fifth and sixth passes.

Since side brush assembly actuated contacts 144 will no longer be effective to limit travel of the carriage at the end of the third pass, a wand switch 160 carried by the carriage and deflected by contact with the vehicle may be employed to reverse the action when the wand leaves contact with the vehicle. In a four pass wash, the wand switch will only sense the end of the third pass, but in the six pass wash, it may be used at the end of the third, fourth, and fifth passes to reverse the carriage, and thus avoid unnecessary over-travel of the apparatus, as when washing compact vehicles.

Figure 18:
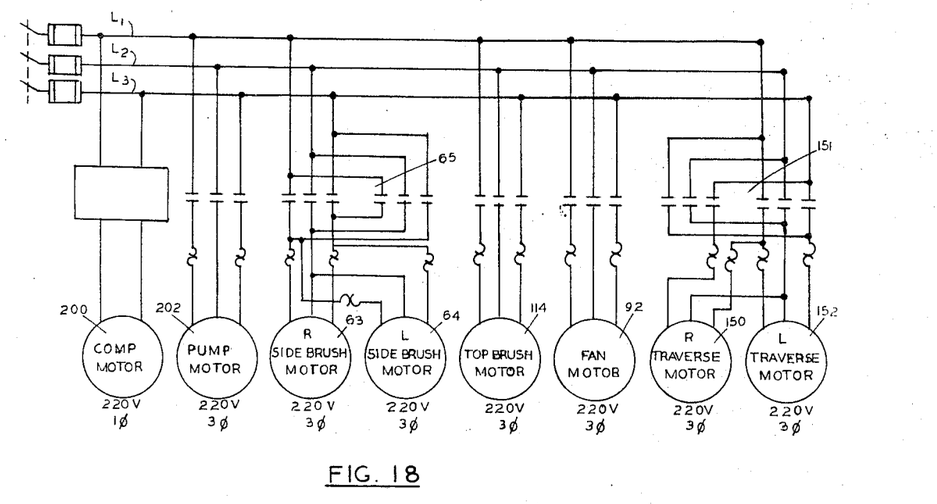
FIGURE 18 is a wiring diagram of the power circuits.

In FIGURE 18 there is shown a three phase power circuit comprising lines L1, L2, and L3. A compressor motor 200 supplies compressed air as needed to a reservoir, not shown. The pump motor 202 supplies wash or rinse water at about 300# pressure during wash and rinse traverses of the apparatus. The side brush motors 63 and 64, are provided with reverse switching 65 actuated by solenoids 163 and 164. The traverse motors 150 and 152 are also provided with reverse switching 151, actuated by solenoids 250 and 252.

Figure 19:
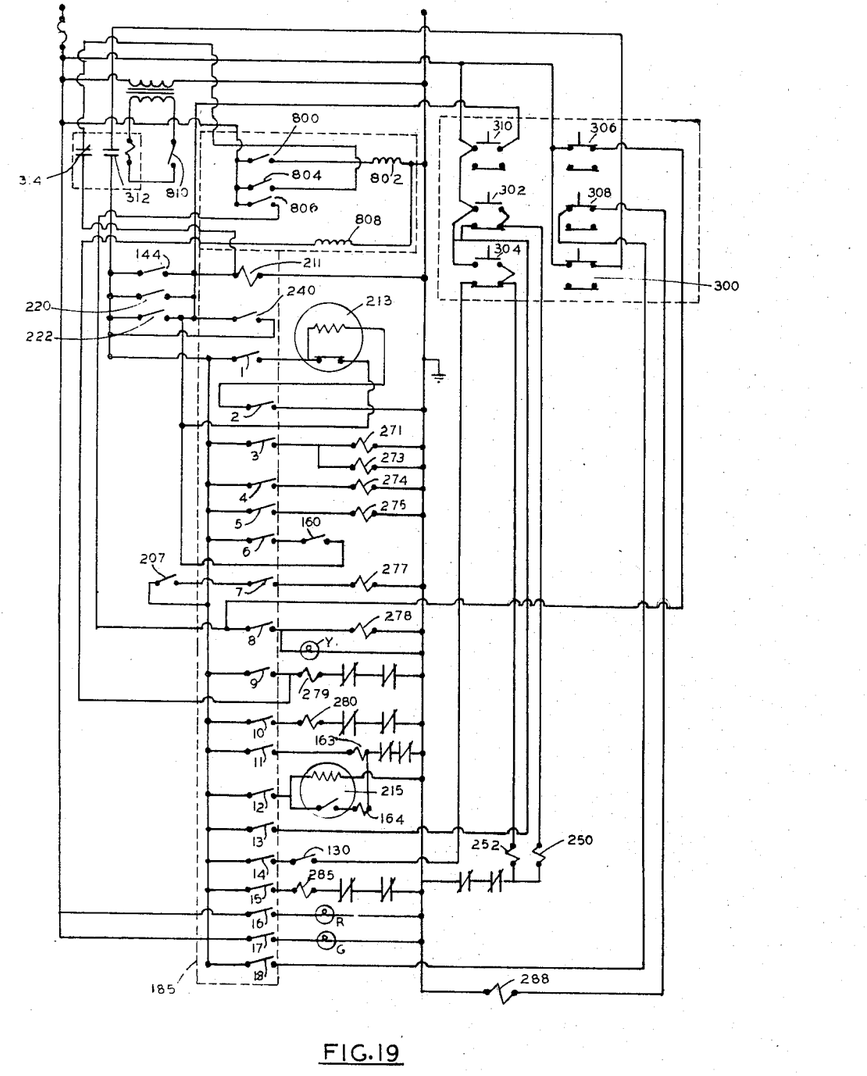
FIGURE 19 is a wiring diagram of the control circuits.

The control circuit in FIGURE 1, includes a sequence drum switch 185 having twelve successive positions and a plurality of cam actuated switches 1–18 inclusive. Switch 3 controls air valve solenoids 271 and 273 for cylinders 72 and 74, and 73 and 75. Switch 4 controls the wash water valve solenoid 274. Switch 5 controls the rinse water valve solenoid 275. Switch 7 controls the air valve solenoid 277 for the top brush cylinder. Switch 8 controls the wax valve solenoid 278 and yellow signal light Y. Switch 9 controls the blower solenoid 279. Switch 10 controls the starter solenoid 280 for the top brush motor 114. Switches 11 and 12 control the forward and reverse solenoids 163 and 164 for the brush motors 63 and 64. Switches 13 and 14 control the forward and reverse switch solenoids 250 and 252. Switch 15 controls the water pump motor starter solenoid 285. Switches 16 and 17 control the red and green signal lights R and G. Switch 18 controls the solenoid 288 of the detergent valve.

Figure 20:
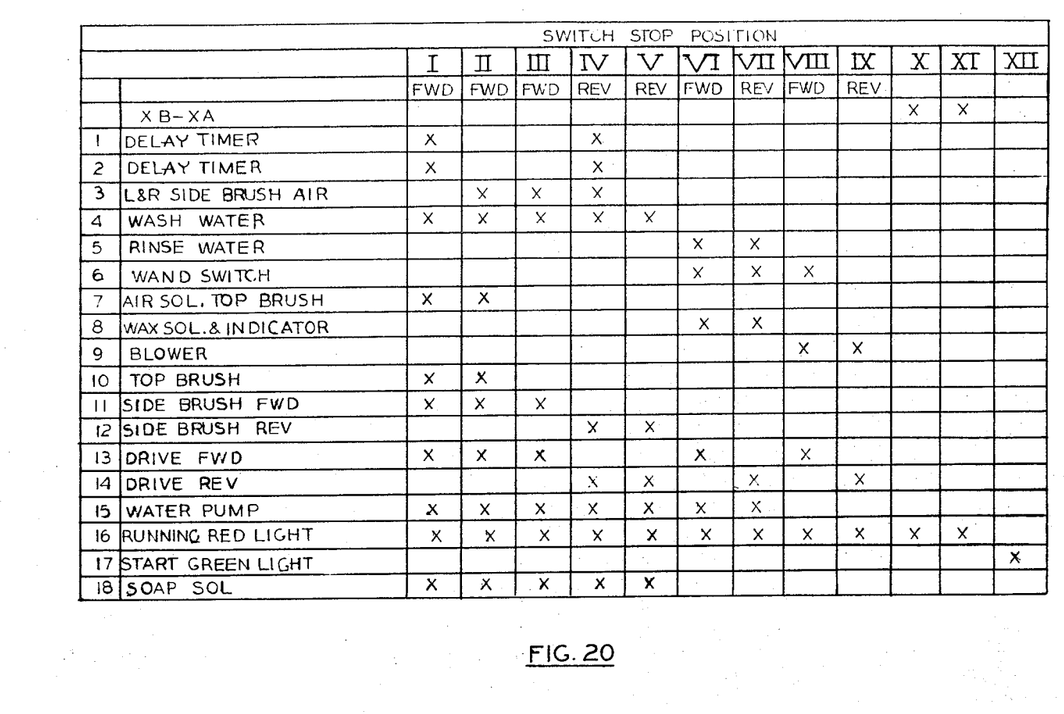
FIGURE 20 is a chart showing the sequence of operations in a complete wash cycle employing six traverses.

In FIGURE 20 the successive positions and the switches actuated for a six pass wash cycle are charted. It will be seen that in the first position I, switches 1, 2, 4, 7, 10, 11, 13, 15, 16 and 18 are closed so that wash water is supplied, the top brush lowered by exhausting the air cylinder 122, rotation of the side brushes and top brush commences, and the carriage forward drive begins. Also the water pump, soap solution, and "running" red light controls are activated.

Should it be desired to not employ the top brush, due to roof mounted equipment unsuited to brush operation, switch 207 may be manually opened.

A normally closed five second delay timer 213 is also activated by closure of contacts 1 and 2, and the drum solenoid 211 is energized, until timer 213 breaks the circuit, whereupon the timer drum is advanced to position II, drum advance being effected only on deenergization of solenoid 211. On advance to position II, contacts 1 and 2 are opened, and contacts 11 are closed, causing air to be admitted to cylinders 72 and 73 to swing the brushes against the car sides under steady pressure, while being pushed by the carriage, as for example, indicated in FIGURE 3. As the carriage reaches the position in FIGURE 6, the brush arm assembly 48 is shown as swinging toward the position indicated in FIGURE 7 prior to reaching the end position indicated in FIGURE 8, and in so doing, cam lug 142 actuates switch 144 to energize and deenergize solenoid 211 and advance the drum switch to position III, restoring air pressure to cylinder 122 to lift the top brush, and to stop the rotation of the top brush. Lifting of the top brush to clear the vehicle closes safety switch 130.

Figure 8:
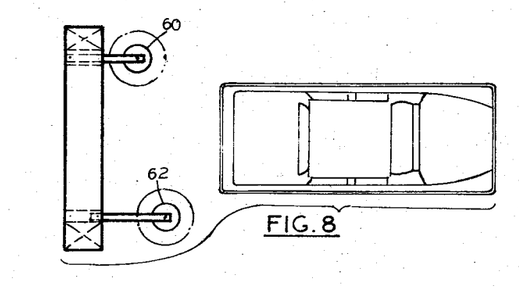
Figure 9:
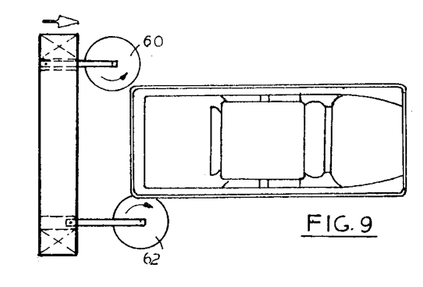
Figure 10:
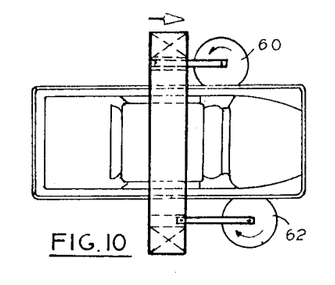

The swinging of the brush arm assembly into the position shown in FIGURE 8 is somewhat retarded by the shock absorber 82. In reaching such position, lug 140 trips switch 144, advancing the drum to position IV. In this position, carriage travel is reversed, contacts 13 being opened, and contacts 14 being closed. Reverse traverse is dependent upon safety contacts 130 being held closed. Air pressure to brush cylinders 72 and 73 is momentarily retained. Rotation of the brushes 60 and 62 is reversed after a two second delay through closure of contacts 12. Time delay device 215, normally open, provides such delay to permit the heavy wet brushes to decelerate before reversing the power. As the same contacts 1 and 2 close to energize time delay device 213, to energize drum solenoid 211 for five seconds. Upon deenergization of solenoid 211, the drum advances to position V, which operates to energize valve solenoids 271 and 273 to discontinue air pressure to cylinders 72 and 73, and pressurize cylinders 74 and 75, to swing the brushes into vehicle side contact during the reverse traverse and cause the brushes to move into position to wash the front end of the vehicle as indicated in FIGURES 11–14 before reaching the end position shown in FIGURE 15. Reaching this position, the carriage trips a switch 220 to momentarily energize drum solenoid 211, and advance the drum to position VI, cutting off wash water, and introducing rinse water and reversing the traverse drive motors 150 and 152.

Also in position VI, switch contacts 6 are closed to activate the wand switch 160 carried by the apparatus. The wand switch is closed and held closed by deflection of the wand against the car side, thereby energizing the drum solenoid 211, which remains energized so long as the wand is deflected by vehicle contact. As soon as the wand clears the vehicle, wand switch 160 opens, solenoid 211 is deenergized and the drum switch advances to position VII, to establish reverse drive. On reverse drive, the wand actuated switch may again be closed by vehicle deflection to energize solenoid 211, and upon clearing the vehicle, the solenoid 211 will be deenergized and the drum switch advanced to position VIII, the carriage being reversed to forward drive. The drum switch when advanced to position VIII, cuts off the rinse water, and starts the blower, to dry the vehicle. On the forward drying, or fifth pass, the wand switch is again closed by vehicle deflection, reenergizing solenoid 211. When the vehicle clears the wand, switch 160 opens and the solenoid 211 is deenergized, thereby advancing the drum switch to position IX to reverse the drive. The wand switch circuit is also deactivated, so that the carriage returns to the stop positions as controlled by tripping the track activated carriage limit switch 220. A second track activated carriage limit switch 222 may be provided as an overall limit to forward travel.

Actuation of the limit switch 220 advances the drum to position X, which closes a stepping circuit for advancing the drum, so long as contacts 240 are allowed to remain closed, as in positions X and XI, so that the drum is advanced to the off position XII, where contacts 240 are opened. In position XII a green light signal circuit is activated through contacts 17, and the red light signal circuit is deactivated by opening of contacts 16.

A manual control station may be provided having a control switch 300 adapted to be opened to stop the operation. Also provided are forward and reverse drive control switches 302 and 304, actuation of either acting to disconnect the drive motor from the drum switch, and to establish manual control over the drive. A wax control switch 306 and a soap control switch 308 are provided. Actuation of the switch 300 breaks the circuit to the drum relay contacts. Opening either the wax control switch or the soap control switch or both eliminates the wax treatment, or the supply of detergent to the wash water.

A step switch 310 is provided, whereby the drum can be advanced through its positions one step at a time.

A coin control, having a coin operated switch 800 actuating a ratchet solenoid 802 to close the wax switch when the proper number of coins have been inserted, and to close the wax switch 806 upon deposit of a further coin is provided. The control includes an unlatching solenoid 808 which restores the coin control after energization and deenergization. Such solenoid 808 may be energized by closure of blower contacts 9, and thus be deenergized at the end of the blower operation to restore the coin control for subsequent operation.

Commencement of operation is effected by closure of treadle switch 810 momentarily opening contacts 312, and closing contacts 314, the latter in circuit with the coin control wash switch 804, which thereby energizes solenoid 211, which, upon deenergization, advances the drum switch from position XII to position I to start the operation.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A vehicle washing apparatus including a pair of fixed rails extending in parallel relation and being spaced apart to provide for the parking of a vehicle therebetween, a frame having spaced apart columns movable along said rails in opposite directions lengthwise of the vehicle, a reversible power driving means for imparting movement to said frame, a brush carrier assembly mounted on each leg column, having spaced pivoted arms adapted to swing through an angle of approximately 180 degrees and between positions extending forwardly of the frame, and rearwardly of the frame, a vertically disposed brush journalled for rotation about a vertical axis in each of said assemblies, said brushes being normally in a start position with the arms extending forwardly of the frame and with the brushes disposed between an end of the vehicle and the frame, and spaced apart a sufficient distance to permit passage of the vehicle between the brushes without contact therewith when non-rotating, means operable upon initial movement of the frame toward the end of the vehicle to effect rotation of said brushes, and means for urging said brushes into brushing contact with the side walls of said vehicle after said brushes have cleared said end, said last means being adapted to urge said brushes to move through an angle of 180 degrees upon reaching the other end of the vehicle, and on continued travel of the frame beyond the other end of the vehicle, each of said brushes moving inwardly and outwardly over a half of the other end of the vehicle in moving through said angle of 180°.

2. A vehicle washing apparatus according to claim 1 having means for reversing the movement of the frame acting in response to the swinging of the brushes through said angle of 180°, and means for urging said brushes into brushing contact with the sidewalls of said vehicle after said brushes have cleared said other end, said last named means being adapted to urge said brushes to swing back through an angle of 180 degrees upon reaching the one end of said vehicle, and on continued travel of the frame beyond the said one end of the vehicle, each of said brushes moving inwardly and outwardly over a half of the said one end of the vehicle in moving back through an angle of 180 degrees to the position when returned to said start position.

3. A vehicle washing apparatus according to claim 2 having means to reverse the rotation of the brushes upon reversing the movement of the frame and wherein the rotation of the brushes is such that the side contacting bristles move in the direction of the direction of movement of the frame.

4. A vehicle washing apparatus dependent on claim 3 wherein the pivotal support upon the column of the arm of one of the brush assemblies is staggered in relation to the pivotal support upon the other column of the arm of the other brush assembly, whereby one brush upon reaching the other vehicle end travels to the center of the vehicle end ahead of the other brush, and whereby the other brush on reaching the one end of the vehicle travels to the center of the vehicle end ahead of the one brush.

5. A vehicle washing apparatus according to claim 2 wherein the pivotal support upon the column of the arm of one of the brush assemblies is staggered in relation to the pivotal support upon the other column of the arm of the other brush assembly, whereby one brush upon reaching the other vehicle end travels to the center of the vehicle end ahead of the other brush, and whereby the other brush on reaching the one end of the vehicle travels to the center of the vehicle end ahead of the one brush.

6. A vehicle washing apparatus according to claim 2 having means for driving the frame to the other end of the car and returning to the start position while effecting operations ancillary to washing and scrubbing, and means for terminating rotation of said brushes and holding them in the start position during operation of said last named driving means.

7. A vehicle washing apparatus according to claim 1 wherein the rotation of the brushes is such that the side contacting bristles of the brush move in the direction of the direction of movement of the frame.

8. A vehicle washing apparatus dependent on claim 7 wherein the pivotal support upon the column of the arms of one of the assemblies is staggered in relation to the pivotal support upon the other column of the arms of the other brush assembly, whereby one brush upon reaching the other vehicle end travels to the center of the vehicle end ahead of the other brush.

9. A vehicle washing apparatus according to claim 1 wherein the pivotal support upon the column of the arms of one of the assemblies is staggered in relation to the pivotal support upon the other column of the arms of the other brush assembly, whereby one brush upon reaching the other vehicle end travels to the center of the vehicle end ahead of the other brush.

References Cited

UNITED STATES PATENTS 3,300,803  1/1967  Seakin.

FOREIGN PATENTS 1,238,794  4/1967  Germany.

EDWARD L. ROBERTS, *Primary Examiner.*